United States Patent [19]

Moriyama et al.

[11] Patent Number: 4,554,529

[45] Date of Patent: Nov. 19, 1985

[54] METHOD FOR CONVERTING BINARY DATA TRAIN

[75] Inventors: Yoshiaki Moriyama; Kenji Yamagata, both of Tokorozawa, Japan

[73] Assignee: Pioneer Electronic Corporation, Tokyo, Japan

[21] Appl. No.: 437,129

[22] Filed: Oct. 28, 1982

[30] Foreign Application Priority Data

Oct. 29, 1981 [JP] Japan .................... 56-173258

[51] Int. Cl.$^4$ ............................................ H03K 13/24
[52] U.S. Cl. ................................ 340/347 DD; 360/39
[58] Field of Search ................. 340/347 DD; 360/32, 360/40-48, 39; 375/19; 371/55

[56] References Cited

U.S. PATENT DOCUMENTS 3,564,557  2/1971  Ruthazer ................. 340/347 DD
4,352,129  9/1982  Baldwin .................... 360/32

Primary Examiner—Charles D. Miller
Attorney, Agent, or Firm—Fleit, Jacobson, Cohn & Price

[57] ABSTRACT

In order to obtain sufficiently long values of $T_{min}$ and $T_w$ data conversion, and to reduce the dc or the low frequency component, a method for converting a binary data train comprises a first step for dividing the binary data train into a plurality of successive blocks each having M (M being a natural number) bit data, a second step for converting the M bit data into N (N being a natural number, and where $N \geq M+1$), and a third step for converting the N bit data in every L (L being a natural number) blocks into J (J being a natural number) bit data.

7 Claims, 11 Drawing Figures

Fig. 2

| $d_{11}$ $d_{12}$ | $c_{11}$ $c_{12}$ $c_{13}$ |
|---|---|
| 0   0 | 0   1   0 |
| 0   1 | 0   0   1 |
| 1   0 | 1   0   0 |
| 1   1 | 1   0   1 |

Fig. 3

| $d_{11}$ $d_{12}$ $d_{21}$ $d_{22}$ | $c_{11}$ $c_{12}$ $c_{13}$ $c_{21}$ $c_{22}$ $c_{23}$ |
|---|---|
| 0   1 · 1   0 | 0   1   0 · 0   0   0 |
| 0   1 · 1   1 | 0   0   1 · 0   0   0 |
| 1   1 · 1   0 | 1   0   0 · 0   0   0 |
| 1   1 · 1   1 | 1   0   1 · 0   0   0 |

Fig. 4

| $c_{i1}$ $c_{i2}$ $c_{i3}$ | | $b_1$ | $b_2$ | $b_3$ | $b_4$ |
|---|---|---|---|---|---|
| 0   1   0 | $P_1$ | 0 | 0 | 1 | 0 |
|           | $P_2$ | 0 | 0 | 0 | 0 |
| 0   0   1 | $P_1$ | 0 | 1 | 0 | 1 |
|           | $P_2$ | 0 | 0 | 0 | 1 |
| 1   0   0 | $P_1$ | 1 | 0 | 1 | 0 |
|           | $P_2$ | 1 | 0 | 0 | 0 |
| 0   0   0 | $P_1$ | 0 | 1 | 0 | 0 |
| 1   0   1 | $P_1$ | 1 | 0 | 0 | 1 |

Fig. 5

| $c_{i1}$ $c_{i2}$ $c_{i3}$ | | $b_1$ | $b_2$ | $b_3$ | $b_4$ | $b_5$ |
|---|---|---|---|---|---|---|
| 0  1  0 | $P_1$ | 0 | 1 | 0 | 1 | 0 |
|         | $P_2$ | 0 | 0 | 0 | 1 | 0 |
|         | $P_3$ | 0 | 1 | 0 | 0 | 0 |
| 0  0  1 | $P_1$ | 0 | 0 | 1 | 0 | 1 |
|         | $P_2$ | 0 | 1 | 0 | 0 | 1 |
|         | $P_3$ | 0 | 0 | 0 | 0 | 1 |
| 1  0  0 | $P_1$ | 1 | 0 | 1 | 0 | 0 |
|         | $P_2$ | 1 | 0 | 0 | 1 | 0 |
|         | $P_3$ | 1 | 0 | 0 | 0 | 0 |
| 0  0  0 | $P_1$ | 0 | 0 | 1 | 0 | 0 |
|         | $P_2$ | 0 | 0 | 0 | 0 | 0 |
| 1  0  1 | $P_1$ | 1 | 0 | 1 | 0 | 1 |
|         | $P_2$ | 1 | 0 | 0 | 0 | 1 |

METHOD FOR CONVERTING BINARY DATA TRAIN

BACKGROUND OF THE INVENTION

1. Field of the Invention

The present invention relates to a method for converting a binary data train, and more specifically to a binary data conversion method wherein binary data is recorded in a high-density recording medium, or binary data is transmitted through a transmission system having a relatively narrow bandwidth.

2. Description of the Prior Art

Various methods of binary data modulation record data onto a high-density recording medium, such as a magnetic tape, a magnetic disc, or an optical disc, or transmit binary data through a transmission system.

Such methods of binary data modulation, especially for the high density recording or the high density transmission, can be treated as combination of a process of binary data conversion and a process of modulation of a binary signal train which is obtained by the binary data conversion. In such a binary data conversion process, a binary data train is divided into a series of blocks, each having an M bit binary code (M is a natural number), and then, the M bit binary code is converted into an N bit binary code. The process of modulation is generally either an NRZI (Non-Return to Zero Inverse) fundamental modulation process or an NRZ (Non-Return to Zero) process.

Generally, the process of modulation for the high density of recording must comply with the following conditions:

(i) The minimum interval (referred to as $T_{min}$ hereinafter) of the inversion of the recording signal is sufficiently long and the maximum interval (referred to as $T_{max}$ hereinafter) thereof is sufficiently short;

(ii) The window of detection (referred to as $T_w$ hereinafter), which the time duration for detecting the recorded bits from a signal reproduced from the recording medium, is sufficiently wide; and (iii) The signal to be recorded on the recording medium, which is obtained after modulation, does not contain a dc component or a low frequency component.

A long $T_{min}$ is suitable for reducing interference between two adjacent inversions and enables a high density recording. On the other hand, a short $T_{max}$ is advantageous for self-synchronization.

Since the detection of the recorded bits is effected by detecting peak values of a reproduced signal wave in the case of magnetic recording system, a wide $T_w$, which determines the tolerance of the error of the position of detection, is advantageous for the high density recording. Also, in the case of a recording system employing a laser beam, the wide $T_w$ improves the signal to noise ratio due to an increased amplitude of the signal at the point of detection.

Furthermore, if a recording signal having a dc component or a low frequency component is applied to a transmission system which does not transmit the low frequency component, the waveform of such a signal is distorted. In addition, such a dc component or a low frequency component would cause a malfunction of the servo systems of a recording system employing a laser beam. If the signal does not include a significant and essential dc or low frequency component, a high pass filter can be employed to suppress the low frequency noise or drift components.

Among the prior art methods of modulation, the Zero Modulation (ZM) and the Modifield Miller ($M^2$) techniques satisfy the above-descrived condition (iii); however, in those methods of modulation, the time length of $T_{min}$ is almost the same as the time length T of a bit of the data before modulation ($T_{min} \approx T$ in the case of the ZM, and $T_{min} = T$ in the case of $M^2$), and therefore is not sufficiently long.

A long $T_{min}$ ($T_{min} = 1.5T$) is obtained in the Three Position Modulation (3M) technique, however, it does not satisfy the above condition (iii).

The Eight to Fourteen Modulation (EFM) technique which has been proposed recently, has a long $T_{min}$ of 1.41T, and satisfies the condition (iii); however, it has the drawback of short $T_w$ of 0.47T. Furthermore, the EFM technique has a problem that the structures or the modulator and the demodulator tend to be complicated since 8 bit data is converted to 14 bit data is a relatively large sized unit.

SUMMARY OF THE INVENTION

An object of the invention is therefore to provide a method for converting binary data in which a modulated signal does not have any dc or low frequency components and at least one of the $T_{min}$ and the $T_w$ thereof is sufficiently long.

Another object of the invention is to provide a converting method in which the structure of the demodulator can be simplified.

According to the present invention, a binary data conversion method comprises a first step of dividing a binary data train into a series of successive blocks, each having M bit data (M being a natural number), a second step of converting each of the M bit data into N (N being a natural number and equal to or larger than M+1) bit data, and a third step for converting an N bit data in every L number of the blocks into J bit data.

The foregoing and other objects and advantages of the present invention will become more clearly understood upon review of the following description taken in conjunction with the accompanying drawings.

BRIEF DESCRIPTION OF THE DRAWINGS

FIGS. 2 through 5 are graphs showing the transformations in each step of the data conversion;

DETAILED DESCRIPTION OF PREFERRED EMBODIMENTS

Reference is first made to FIGS. 1A through 1D in which an embodiment of the data conversion method according to the present invention is depicted.

Figure 1:
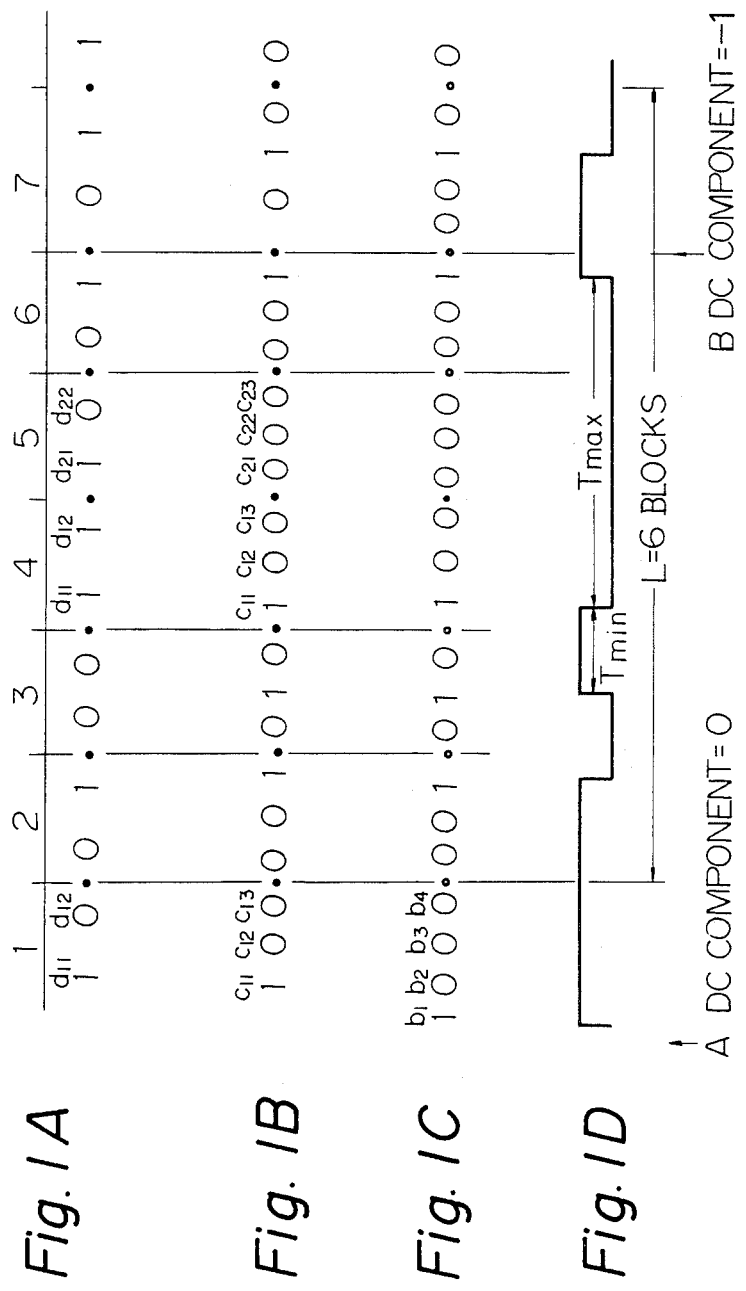
FIGS. 1A through 1D are diagrams showing the relation between the steps of the data converting method according to the present invention.

FIG. 1A shows successive binary data which is to be recorded in such recording medium as a digital audio disc (DAD). The binary data is divided into a plurality of blocks each of which has two bits of data, and the groups are designated from No. 1 through No. 7 in the figure.

Each block of 2 bit data in the blocks shown in FIG. 1A is then converted to 3 bit data shown in FIG. 1B according to rules shown in FIGS. 2 and 3 which will be explained hereafter.

More specifically, each 2 bit data block, such as $d_{11}$ and $d_{12}$ shown in FIG. 1A, are in turn converted to 3 bit data $C_{11}$, $C_{12}$, and $C_{13}$ shown in FIG. 1B in accordance with the rule shown in the truth table of FIG. 2, which is expressed by equations as follows:

$$C_1 = d_1,\ C_3 = d_2,\ \text{and}\ C_2 = \overline{C_1 + C_3},$$

in which $d_1$ and $d_2$ are respectively higher bit and lower bit binary code of the 2 bit data, $C_1$ through $C_3$ are respective three binary codes of the 3 bit data, in the order of higher bit, middle bit, and lower bit.

However, if adjacent binary codes which belong to different blocks, such as $d_{12}$ and $d_{21}$ of blocks No. 4 and No. 5 shown in FIG. 1A are 1, the conversion is effected in accordance with the rule shown in the truth table of FIG. 3, which is expressed as follows;

$$C_{11} = d_{11},\ C_{13} = d_{22},\ C_{12} = \overline{C_{11} + C_{13}},\ \text{and}$$
$$C_{21} = C_{22} = C_{23} = \overline{d_{12} = d_{21}} = 0,$$

in which $d_{11}$, $d_{12}$, $d_{21}$, and $d_{22}$ are binary codes of 2 bit data in two successive blocks, and $C_{11}$, $C_{12}$, $C_{13}$, $C_{21}$, $C_{22}$, and $C_{23}$ are binary codes of 3 bit data after the conversion.

Furthermore, if adjacent binary bits belonging to different blocks are all 1 through the successive three blocks, the binary data in the first two blocks are converted in accordance with the rule shown in FIG. 3, and the binary data in the last block are converted in accordance with the rule shown in FIG. 2.

With the step of conversion, the minimum and the maximum number of zeros between adjacent two ones in the successive 3 bit data obtained by the conversion is, respectively, 1 and 7; therefore self-synchronization becomes possible. Furthermore, the $T_{min}$ and the $T_w$ thereof are sufficiently large values of $(4/3)T$ and $\frac{2}{3}T$, respectively, and the value of $T_{max}$ is $(16/3)T$.

In addition, since the conversion step according to FIG. 2 and FIG. 3 has a relatively small unit of conversion and has a desirable arrangement of conversion, an actual circuit for effecting the conversion or the reverse conversion thereof can be simplified.

Subsequently, a first 3 bit binary code in every six blocks shown in FIG. 1B is converted to a 4 bit binary code shown in FIG. 1C in accordance with either one of the bit patterns $P_1$ and $P_2$ shown in the truth table of FIG. 4.

FIG. 1D shows an example of a recording signal which is derived from the binary data shown in FIG. 1C, wherein a one in the binary data represents an inversion, and a zero in the binary data represents a noninversion.

The bit pattern, i.e., either one of $P_1$ and $P_2$, to be used in the above-described conversion is selected such that the magnitude of a dc or a low frequency component of a recording signal constituted by 6 blocks, such as the signal shown in FIG. 1D, would be the minimum.

The calculation of the dc component is, for example, executed by an accumulation of $+1$ and $-1$ values, which respectively correspond to the high level and the low level of the recording signal, the through 6 blocks in which the conversion is to be effected.

In the case of the example of the data shown in FIG. 1B, the cumulative values of the dc component of two recording signals, from a point A through a point B including six blocks, which would be obtained by the conversion according to the bit patterns $P_1$ (1000) and $P_2$ (1010), are respectively $-1$ and $+5$. Therefore, the bit pattern $P_1$ (1000) is selected, as shown in the first block of FIG. 1C. The determination of the bit pattern in the seventh block is executed in the same manner as described above.

In addition, the selection of the three bit patterns, "0000", "0001", and "1000" is permitted only when the value of $T_{max}$ would not be greater than $(16/3)T$, i.e., when the number of adjacent "0"s is smaller than eight.

Furthermore, a number of L blocks in the second conversion of the binary codes, i.e., the conversion according to the truth table of FIG. 4, is selected in view of the upper limited frequency of the low frequency component which should be eliminated. Specifically, if L is small, the upper limited frequency will be high, and on the other hand, if L is large, the upper limited frequency will be low. Furthermore, $T_{max}$ and $T_w$ are short when L is small, and are long when L is large.

In the case of the embodiment described above, the number L is selected to be six.

The values of $T_{min}$, $T_{max}$ and $T_w$ in the embodiment are calculated in terms of the number L, as follows:

$$T_{min} = \frac{3L}{3L+1} \cdot \frac{4}{3} T$$

$$T_{max} = \frac{3L}{3L+1} \cdot \frac{16}{3} T$$

$$T_w = \frac{3L}{3L+1} \cdot \frac{2}{3} T$$

Furthermore, the rule of conversion shown in FIG. 4 can be replaced by a rule shown in FIG. 5. In that case, the dc or the low frequency component of the recording signal is effectively reduced. On the other hand, $T_{min}$ and $T_w$ are shorter than thoe of the previous case.

Figure 6A:
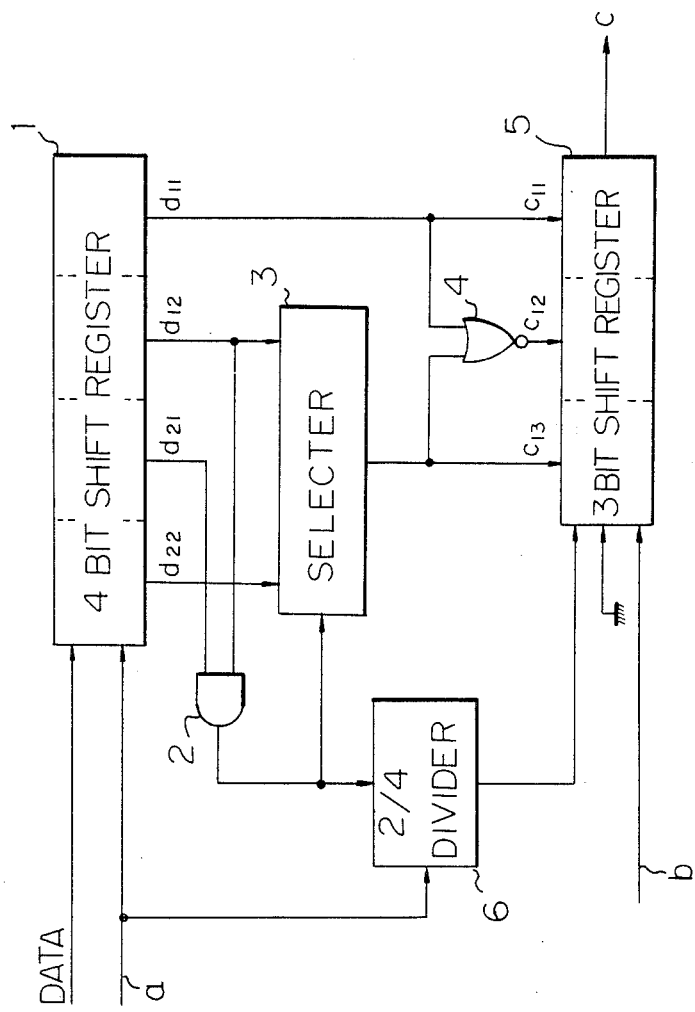
FIGS. 6A and 6B are circuit diagrams of an example of a conversion circuit according to the present invention.
Figure 6B:
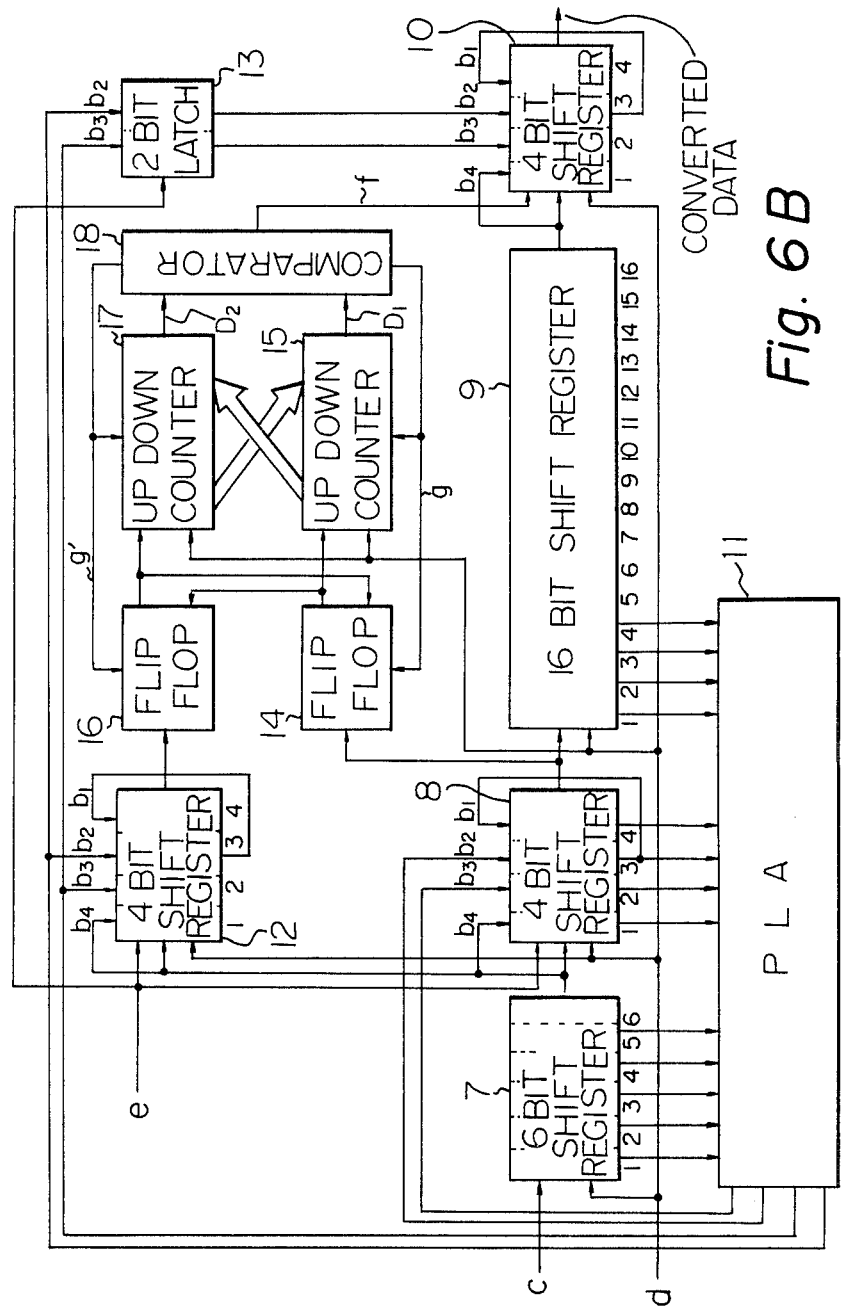

Turning to FIGS. 6A and 6B, an example of a circuit, designed for conversion according to the present invention will be explained. FIG. 6A shows a circuit part for executing the conversion according to the rules shown in FIGS. 2 and 3. FIG. 6B shows a circuit part for executing the conversion according to the rule shown in FIG. 4.

In FIG. 6A, a plurality of binary codes which form a data train are in turn applied to a four bit shift register 1 in accordance with a clock pulse a. When the binary codes of two blocks, i.e., four bits, have been applied, the shift register 1 produces four output signals $d_{11}$, $d_{12}$, $d_{21}$, and $d_{22}$, in which $d_{12}$ are applied to an AND gate 2. If $d_{12} = d_{21} = 1$, the AND gate 2 produces an output signal of logic 1 which is applied to a selector circuit 3.

The selector circuit 3, also receiving the output signals $d_{22}$ and $d_{12}$ of the shift register 1, transmits the signal $d_{12}$ to a NOR gate 4 and to one of several parallel inputs of a three bit shift register 5 as a signal $C_{13}$ upon reception of the output signal of logic 1 of the AND gate 2. When the output signal of the AND gate 2 takes logic 0, the selector circuit 3 passes therethrough the signal $d_{12}$. The output signal $d_{11}$ of the four bit shift register 1 is applied to the NOR gate 4 and to one of the parallel inputs of the three bit shift register 5, as a signal $C_{11}$. The output signal of the NOR gate 4 is also applied to one of the parallel inputs of the three bit shift register 5 as a signal $C_{12}$.

A divider circuit 6 receives the output signal of the AND gate 2 and the clock pulse a and produces an output clock signal which is obtained by dividing the clock pulse a by 4 when the output signal of the AND gate 2 is 1, and produces an output clock signal by dividing the clock pulse a by 2 when the output signal of the AND gate is logic 0.

The output clock signal of the divider circuit 6 is applied to a load signal input terminal of shift register 5. A serial input terminal of the shift registers is applied with a 0 level, and a shift clock input terminal thereof is applied with a clock pulse b which has a repetition rate of 1.5 times of that of the clock pulse a.

Therefore, the data loading of the shift register 5 is effected after completion of a four bit shift of the contents of the shift register 1 when the output signal of the AND gate 2 is logic 1. While the four bit shift of the contents of the shift register 1 takes place, the contents of the shift register 5 are shifted by 6 bit, and three zeros which have been applied to the serial input terminal thereof subsequent to the application of $C_{11}$, $C_{12}$, and $C_{13}$, are outputted from the serial output terminal of the register 5, as signals $C_{21}$, $C_{22}$, and $C_{23}$. Thus, the conversion according to the rule shown in FIG. 3 is executed.

If the output signal of the AND gate 2 is 0, the data load of the shift register 5 from the parallel input terminals thereof takes place when the contents of the shift register 1 is shifted by two bits, and the signals $C_{11}$, $C_{12}$, and $C_{13}$ are outputted from the serial output terminal of the shift register 7. Thus, the conversion according to the rule shown in FIG. 2 is executed.

Turning to FIG. 6B, the circuit for executing the conversion shown in FIG. 4 will be explained.

The output signal C of the shift register 5 in FIG. 6A is applied to a serial input terminal of a six bit shift register 7. A clock input terminal of the shift register is applied with a clock pulse d which is synchronized with the clock pulse b.

A circuit (not shown) is provided for stopping the clock pulses a and b during one clock period of the clock pulse d when the last bit of a particular block, to which the conversion of FIG. 4 is applied, the plurality of blocks for each conversion, i.e., six blocks in this case, is outputted from the shift register 5. With the operation of this circuit, the shift register 7 receives the signals $C_{i1}$, $C_{i2}$, $C_{i3}$ and $C_{i3}$ (i=1 or 2) when the signals $C_{i1}$, $C_{i2}$ and $C_{i3}$ are produced by the shift register 5.

An output signal of the shift register 7 is applied to a four bit shift register 8 and then to a sixteen bit shift register 9 and a four bit shift register 10.

Parallel output signals of the shift register 7, which correspond to five bits from a bit which is lastly applied to the shift register 7, parallel output signals of the shift register 8, and parallel output signals of the shift register 9, which correspond to four bits from a bit which is lastly applied to the shift register 9, are applied to a programable logic array (PLA) 11.

When three bits $C_{i1}$, $C_{i2}$, and $C_{i3}$ of four bits in a block which is to be converted, are received by the shift register 8, the PLA effects its conversion operation in view of those three bits $C_{i1}$, $C_{i2}$ and $C_{i3}$ and another five bits of both sides of the block. In other words, when ($C_{i1}$, $C_{i2}$, $C_{i3}$) is (010), (001), or (100), the PLA 11 determines whether or not the bit pattern $P_2$ satisfies the condition of $T_{max}$ in view of five bits of both sides of the block.

If the bit pattern $P_2$ satisfies the condition of $T_{max}$, bit patterns $P_1$ and $P_2$ are loaded in the shift register 8 and in a four bit shift register 12 respectively by the PLA 11. In addition, the shift operations in the shift registers 7, 8, 9, 10 and 12 are synchronized with the clock pulse d. Further, the shift registers 8 and 12 load the data from parallel input terminals thereof in synchronization with the clock pulse d, when a load signal e is applied thereto. Similarly, the shift register 10 loads the data from parallel input terminals thereof in synchronization with the clock pulse d, when a load signal f is applied thereto. In those shift registers 8, 10, and 12, the central two terminals of four parallel input terminals thereof are connected to the output terminals of PLA 11, and the other two terminals on both sides are connected to receive data applied to a serial input terminal thereof.

As shown in FIG. 4, the two bits $b_1$ and $b_4$ of the four bit data, which are common in both of bit patterns $P_1$ and $P_2$, are equal to $C_{i1}$ and $C_{i3}$, respectively. Since $C_{i1}$ is present at the third bit terminals of shift registers 8 and 12, and $C_{i3}$ is present at the sixth bit terminal of the shift register 7, the PLA 11 produces only the other two bits $b_2$ and $b_3$ which are not always common bit patterns $P_1$ and $P_2$, and loads them into the shift registers 8 and 12. These two bits $b_2$ and $b_3$ are also stored in a two bit latch 13.

A pair of flip-flops 14 and 16 and a pair of up-down counters 15 and 17 are provided to calculate a pair of absolute values $D_1$ and $D_2$ of the dc components from a time of loading of data for the conversion, to a time just before the next loading, which respectively represent the values when the bit pattern $P_1$ or $P_2$ is adopted.

The flip-flops 14 and 16 receive an output signal of the four bit shift registers 8 and 12, respectively, and apply an output signal to an up-down control input terminal of the up-down counters 15 and 17. The flip-flops 14 and 16 are inverted in state in response to logic "1" signals from the shift registers 8 and 12, respectively. The up-down counters 15 and 17 count up the clock pulse d when a high level signal from the flip-flops 14 and 16 is applied thereto, and count down the same when a low level signal from the flip-flops 14 and 16 is applied thereto. Thus, the up-down counters 15 and 17 accumulate the dc component $D_1$ and $D_2$, respectively. In addition, the up-down counters 15 and 17 are initially set at the absolute value of dc component $D_1$ and $D_2$ of previous data blocks, and it is assumed that $D_1$ is equal to $D_2$ ($D_1 = D_2$).

The accumulated values of dc components $D_1$ and $D_2$ are compared in a comparator 18.

These calculation and comparison processes are complete when the three bits in the bit pattern $P_1$ are received in the shift register 10. If $D_1$ is larger than $D_2$ ($D_1 > D_2$), the comparator 18 produces a load signal f which is applied to a load signal input terminal of the shift register 10. Then, the signals $b_2$ and $b_3$ of the bit pattern $P_2$, which are stored in the two bit latch 13, are loaded to the shift register 10 at the timing of the next clock pulse signal d.

Conversely, if $D_2$ is equal to or smaller than $D_2$ ($D_1 \leq D_2$), the load signal f is not produced, and the contents of the shift register 10 remains as the bit pattern $P_1$.

The comparator 18 also produces either one of a pair of control signals g and g' which are respectively connected to the flip-flop 14 and the up-down counter 15, and the flip-flop 16 and the up-down counter 17 which corresponds to the bit pattern of the larger dc component. Subsequently, the state of the flip-flop (14 or 16) and the up-down counter (15 or 17) which are applied with the control signal (g or g') is set to the same as that of others which correspond to the bit pattern having a lower dc component. Thus, the circuits are set to the initial state of the calculation of the dc components $D_1$ and $D_2$.

When the three bit data ($C_{i1}$, $C_{i2}$, $C_{i3}$) is equal to (0,0,0) or (1,0,1), and when the bit pattern $P_2$ does not satisfy the condition of $T_{max}$, the bit pattern $P_1$ is loaded in both of the shift regiters 8 and 12. In that case, the load signal f is not produced since the dc components $D_1$ and $D_2$ are always equal to each other ($D_1 = D_2$).

Figure 7:
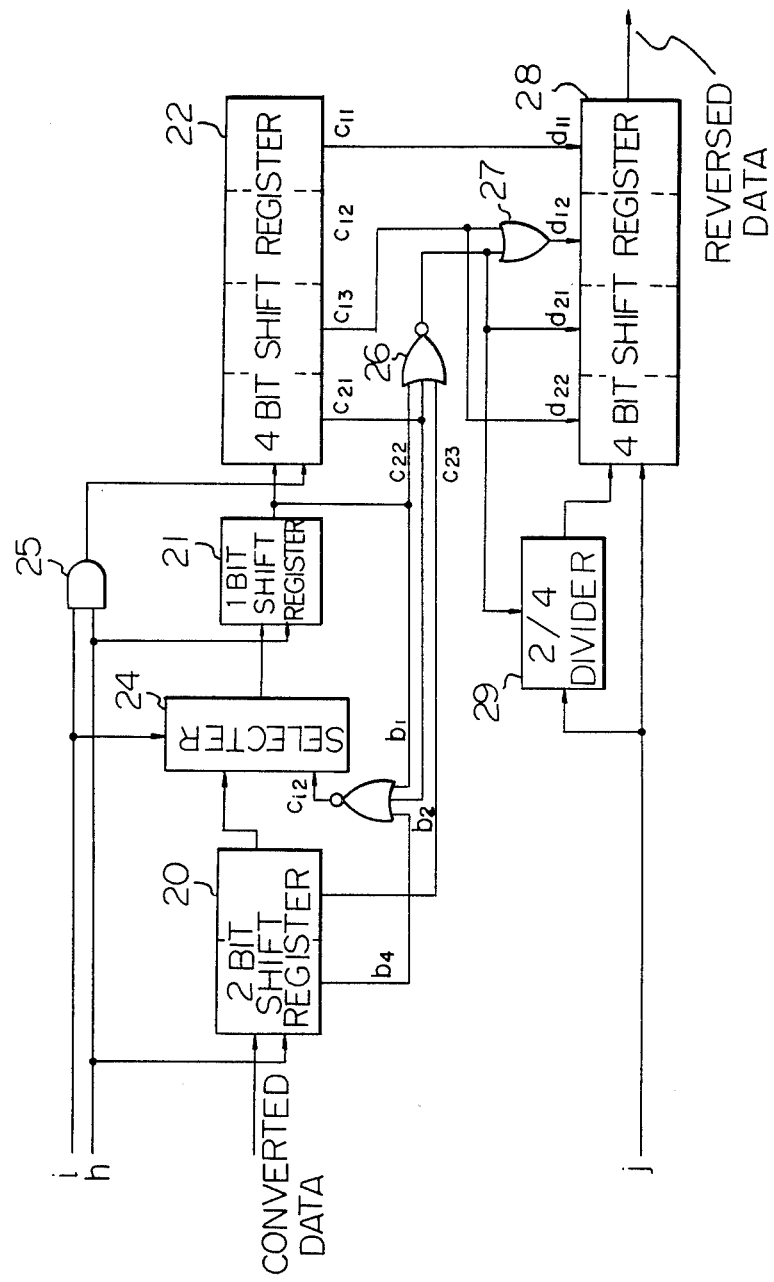
FIG. 7 is a circuit diagram of an example of a circuit for reversing the data which is converted by the circuit shown in FIGS. 6A and 6B.

Turning to FIG. 7, a demodulator circuit for reversing the data converted by the circuit shown in FIGS. 6A and 6B will be explained.

As shown is FIG. 7, a two bit shift register 20, a one bit shift register 21, and a four bit shift register 22 are connected in series relation to form a seven bit shift register.

Converted input data is applied to the two bit shift register 20 in accordance with a clock pulse h. Each binary code of the input signals is applied to the seven bit shift register in two different manners, depending on the type of block to which the binary code belongs.

More specifically, if the binary code of the block to which the conversion according to FIG. 4 is not to be effected, the binary code is in turn received by the seven bit shift register. On the other hand, in the case where the conversion of FIG. 4 is to be effected, a reverse process of the conversion of FIG. 4 is effected when four bits of such block are entered into the two bit shift register 20, into the one bit shift register 21, and into a first bit of the four bit shift register 22.

The resulting three bits of the reverse conversion is maintained in a second bit of the two bit shift register 20, in the one bit shift register 21, and in the first bit of the four bit shift register 22. The first bit of the two bit shift register 21 receives a binary code of a first bit of the next block. In this state, the contents of a second, a third, and a fourth bit of the four bit shift register 22 remain unchanged.

Since the conversion of FIG. 4 is expressed as $C_{i1} = b_1$, $C_{i3} = b_4$, and $C_{i2} = \overline{b_1 + b_2 + b_4}$, the reverse process will be effected by entering $C_{i2}$ in the one bit register 21 by means of a three input NOR gate 23, a control signal i, and selector 24, and by shifting the contents of the two bit shift register 20 by one bit at the same time. In this state, the clock pulse b is stopped by an AND gate 35 and the control signal i which has a 0 level only at this point, and therefore the contents of the four bit shift register 22 are kept unchanged. After the process described above, the shift registers 20, 21, and 22 contain binary codes of blocks which are uniformly formed by three bits.

A NOR gate 26, an OR gate 27, a divider circuit 29, and a four bit shift register 28 are provided to effect a process which has an inverse relation to the conversions shown in FIG. 2 and FIG. 3. When $C_{21} = C_{22} = C_{23} = 0$, NOR gate 26 produces an output signal of 1. Subsequently, two bits $d_{12}$ and $d_{21}$, to be supplied to the four bit shift register 28, are set to 1 ($d_{12} = d_{21} = 1$). The other two bit $d_{11}$ and $d_{22}$ are connected to two bits $C_{11}$ and $C_{13}$ of the four bit shift register 22, respectively. Thus, a process having an inverse relation to the conversion of FIG. 3 is executed.

When the condition $C_{21} = C_{22} = C_{23} = 0$ is not satisfied, the NOR gate 26 produces an output signal of 0; therefore, the two bits $d_{11}$ and $d_{12}$ will be equal to the two bits $C_{11}$ and $C_{13}$ ($d_{11} = C_{11}$, $d_{12} = C_{13}$). Thus, a process having an inverse relation to the conversion of FIG. 2 is executed.

These binary codes $d_{22}$, $d_{21}$, $d_{12}$, and $d_{11}$ are loaded to the shift register 28 and then are outputted one by one in accordance with a clock pulse j.

The divider circuit 29 for producing a load signal of the four bit shift register 28 is supplied with the output signal of the NOR gate 26 and the clock pulse j. When the output signal of the NOR gate 26 is 0, the divider circuit 29 divides the clock pulse j by two, and when the output signal of the NOR gate 26 is 1, the divider circuit 29 divides the block pulse j by four.

Therefore, when the output signal of the NOR gate 26 is 0, the next data is loaded into the four bit shift register 28 at a time when two bits of the inverse signal are outputted therefrom. On the other hand, when the output signal of the NOR gate 26 is 1, the next data is loaded into the four bit shift register 28 at a time when four bits of the inverse signal are outputted therefrom. Thus, successive processes of inverse conversion take place by every one or two blocks, depending on the type of conversion effected.

As described above, the binary data conversion method according to the present invention features a step of converting binary codes in each M bit block of an input data train to N bit binary codes, and a step of converting the N bit binary codes to J bit binary codes at every L blocks of the data train.

Therefore, the converting method can be designed to have a sufficient length of at least one of $T_{min}$ and $T_w$ and to eliminate the dc or low frequency component. Furthermore, the relation between the lengths of $T_{min}$ and $T_w$ and the frequency of the component to be eliminated, can be determined by selecting the values of L and J described above.

In addition, the converting method according to the present invention has an advantage that the construction of the demodulator circuit is relatively simple.

As an example, when the above described values M and N are selected to be 2 and 3 (M=2, N=3) and conversions shown FIGS. 2 and 3 are adopted, as the case of the described embodiment, sufficiently long values of $T_{min}$ and $T_w$ are obtained. The specific values of $T_{min}$, $T_{max}$ and $T_w$ are as follows;

$$T_{min} = \frac{3L}{3L+1} \cdot \frac{4}{3} T, \quad T_{max} = \frac{3L}{3L+1} \cdot \frac{16}{3} T$$

$$T_w = \frac{3L}{3L+1} \cdot \frac{2}{3} T.$$

Moreover, by appropriate design of each conversion, the construction of the demodulator circuit can be further simplified.

In the above equations, when the value of L is 6, as in the embodiment, the described values of $T_{min}$ and $T_w$ are as follows;

$$T_{min} = 1.26T, \quad T_w = 0.63T$$

In this case, $T_{max}$ is 11% less than EFM, and $T_w$ is 34% greater than EFM.

Since the value of $T_w$, as well as the value of $T_{min}$, contributes to the amplitude of the signal at the detection point in the playback mode of a record and playback system employing a laser beam, the converting method according to the present invention has greater amplitude at the detection point, under the range of practical density of recording, than that of the EFM technique.

Thus, the converting method according to the present invention has greater tolerances against noise or fluctuation of the time axis (jitter) of the playback signal.

Due to the advantages described above, the converting method can be applied to various systems of data recording or data transmission, such as a playback system using variation of the electrostatic capacity or a magnetic recording and playback system, to perform high-density data recording or high density data transmission.

Above, a preferred embodiment of the present invention has been described. It shoulld be understood, however, that the foregoing description is illustrative only, and is not intended to limit the scope of the invention. Rather, there are numerous equivalents to the preferred embodiment, and such are intended to be covered by the appended claims.

What is claimed is:

1. A method for converting a binary data train into recording data and recording the same on a recording medium comprising:
    a first step for dividing said binary data train into a plurality of successive M-bit (M being a natural number) data blocks;
    a second step for converting each of said M-bit data blocks into an N-bit (N being a natural number and $N \geq M+1$) data block, said N-bit data block being one of a plurality of bit patterns corresponding respectively to bit patterns of said M-bit data blocks;
    a third step for converting a predetermined data block in every L (L being a natural number) data blocks of said N-bit data block into a J-bit (J being a natural number and $J \geq N+1$) data block, said J-bit data block being one of a plurality of bit patterns corresponding to said bit patterns of N-bit data block; and
    a step for recording a recording signal obtained through the data conversion of said first through third steps on a recording medium;
    wherein at least a predetermined bit pattern of said N-bit data block corresponds to at least two bit patterns of said J-bit data block, and said third step includes a step for selecting one of said at least two bit patterns of J-bit data block corresponding to said predetermined bit pattern of the N-bit data block so that the dc and low frequency components of said recording signal are minimized.

2. A method as recited in claim 1, wherein said M-bit data block and said N-bit data block are respectively a 2-bit data block and a 3-bit data block, and data of said 2-bit data block comprises a first data, a second data, a third data, and a fourth data, and wherein said first step comprises a step for converting said first, second, third, and fourth data into binary bit patterns of "010", "001", "100", and "101", respectively, when each adjacent two data blocks of said M-bit data block are not any one of combinations of "second data.third data", "second data.fourth data", "fourth data.third data", and "fourth data.fourth data", and when said adjacent two data blocks are one of said combinations, converting said one of said combinations into corresponding one of binary bit patterns of "010·000", "001·000", "100·000", and "101·000" which are, respectively, corresponding to each of said combinations.

3. A method as recited in claim 2, wherein said first, second, third and fourth data are bit patterns of "00", "01", "10", and "11" respectively.

4. A method as recited in claim 1 wherein said N-bit data block and J-bit data block are a 3-bit data block and a 4-bit data block, respectively, and wherein said third step comprises a step for converting bit patterns of "010", "001", "100", "000", and "101" of said 3-bit data block into bit patterns of one of "0010" and "0000", one of "0101" and "0001", one of "1010" and "1000", "0100", and "1001", of said 4-bit data block respectively.

5. A method as recited in claim 1, wherein said N-bit data block and said J-bit block are a 3-bit data block and a 5-bit data block respectively, and wherein said third step comprises a step for converting bit patterns of "010", "001", "100", "000", and "101" of said 3-bit data block into bit patterns of one of "01010", "00010" and "01000", one of "00101", "01001" and "00001", one of "10100", "10010" and "10000", one of "00100" and "00000", and one of "10101" and "10001" of said 5-bit data block respectively.

6. A method for converting a binary data train into recording data and recording the same on a recording medium comprising:
    a first step for dividing said binary data train into a plurality of successive 2-bit data blocks respectively consisting of any one of first, second, third, and fourth data;
    a second step for converting said first, second, third and fourth data of said 2-bit data blocks respectively into bit patterns of "010", "001", "100" and "101" when each adjacent two of said 2-bit data blocks are not combinations of "second data.third data", "second data.fourth data", "fourth data.third data", and "fourth data.fourth data", and when said adjacent two of said 2-bit data block are any one of said combinations, converting said one of said combinations into a corresponding one of binary bit patterns "010·000", "001·000", "100·000" and "101·000" which correspond to each of said combinations respectively; and
    recording a recording signal obtained through a conversion of said first and second steps, on a recording medium.

7. A method as recited in claim 6, wherein said first, second, third, and fourth data are bit patterns of "00", "01", "10", and "11", respectively.

* * * * *